Dec. 7, 1965 — O. J. POUPITCH — 3,221,790
NUT LOCK
Filed Dec. 2, 1963
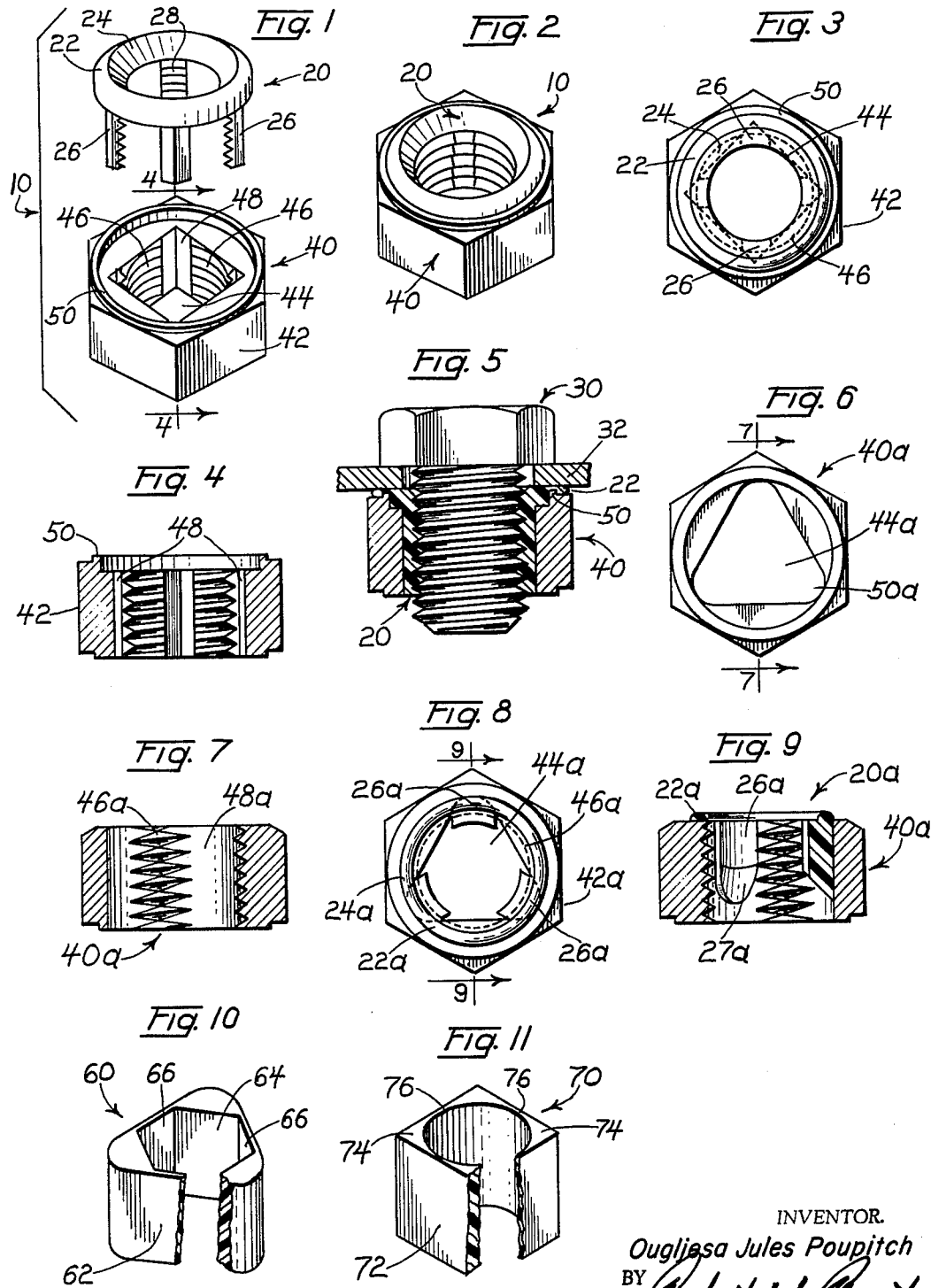
INVENTOR.
Ougljasa Jules Poupitch
BY Robert W. Beart
His Att'y

United States Patent Office 3,221,790
Patented Dec. 7, 1965

3,221,790
NUT LOCK
Ougljesa Jules Poupitch, Itasca, Ill., assignor to Illinois Tool Works Inc., Chicago, Ill., a corporation of Delaware
Filed Dec. 2, 1963, Ser. No. 327,278
6 Claims. (Cl. 151—7)

The present invention relates to a novel fastening device, and more particularly, to a novel locking and sealing nut for use with a complementary threaded male member.

Fasteners with thread locks made of flowing or settable material are known in the art. Most of these fasteners are not, however, provided with locking inserts which provide both a thread and seal lock, and are securely retained in operative position while also providing a quick removal and replacement thereof. In accordance with the present invention, a deformable plastic locking insert has portions thereof which are received within and held against rotation by thread interrupted recesses formed in an aperture of a nut body to lock a complementary threaded male member associated with the nut and insert against unauthorized loosening, and provide a thread seal between the complementary threaded nut and male member.

One object of the present invention is to provide a novel locking nut which is substantially self-locking in assembled relation with a complementary threaded male member.

Another object of the present invention is the provision of a novel locking nut of the above-described type which also forms a seal to prevent fluid from escaping between the threads of the nut and a complementary threaded male member.

A further object of the present invention is the provision of a locking and sealing insert for association with a nut body wherein the insert is easily assembled to, securely retained by, and quickly removed from the nut body.

A still further object of the present invention is to provide a plurality of radially relieved areas in a nut body aperture for receiving similarly configured leg members of a deformable plastic locking insert to lock and seal the nut body with a complementary threaded male member.

Another object of the present invention is to provide a deformable locking insert for a nut body which is either adapted to have preformed threads thereon or have threads cut therein when assembled to a complementary threaded male member.

A further object of the present invention is to provide a locking insert for a nut body which is so formed that it will facilitate the application of a complementary threaded male member from either end of the nut body.

Other objects and advantages of the present invention will become apparent from the following description and the accompanying drawings wherein:

FIG. 1 is an exploded perspective view showing a novel fastening device embodying one form of the present invention;

FIG. 2 is a perspective view showing the elements of the device of FIG. 1 in assembled condition;

FIG. 3 is a top plan view of the assembled novel fastening device shown in FIG. 2;

FIG. 4 is a sectional view of a nut body taken along line 4—4 of FIG. 1;

FIG. 5 is a front elevational view, partly in section, showing the novel fastening device as applied to a workpiece;

FIG. 6 is a top plan view showing a modified form of one of the parts of the novel fastening device;

FIG. 7 is a sectional view of the device shown in FIG. 6, and taken along line 7—7 thereof;

FIG. 8 is a top plan view showing a modified form of both of the elements of the novel fastening device;

FIG. 9 is a sectional view taken along line 9—9 of FIG. 8, and showing the modified elements of the present invention;

FIG. 10 is a perspective view of another modified form of one of the elements of the present invention; and FIG. 11 is a perspective view showing still another modified form of one of the elements of the present invention.

Referring now more specifically to the drawings wherein like parts are designated by the same numerals throughout the various figures, a novel fastening device 10 embodying one form of the present invention is shown in FIGS. 1–5. The device 10 includes a locking insert 20 which is adapted to be assembled to a rotary threaded fastening member 40. The locking insert is preferably formed of a deformable plastic material such as nylon, whereas the rotary fastening member is preferably made of metal.

The locking insert 20 generally comprises an apertured body portion 22 which is integrally associated with a plurality of peripherally spaced leg members 26 for reception within the rotary threaded fastening member 40. Member 40 is a nut body of well known polygonal exterior configuration 42, and having a centrally located aperture 44 provided therein. The aperture of the nut illustrated in the embodiment of FIGS. 1–5 is substantially square in shape, and is provided with a plurality of threaded side walls 46. Intermediate adjacent threaded side walls 46, there is provided axially extending radially relieved areas 48 for receiving the legs 26 of the insert 20. It will be observed from an inspection of FIGS. 1 and 3 that the spacing of the leg members 26 around the apertured body portion 22 of the insert corresponds to the location of the radially relieved areas 48 formed intermediate adjacent threaded side wall surfaces 46 to facilitate assembly of the insert with the nut body. Since the radially relieved areas 48 are the corners of a square-shaped aperture the legs 26 will, therefore, be spaced apart approximately 90° from one another. With this structure, it will be appreciated that the insert may be easily assembled with the nut body merely by aligning the leg members 26 with the radially relieved areas 48, and by then forcing the insert and nut body together.

Once the insert is assembled to the nut body, it will be noted that the insert is held against rotation due to the fact that the projecting outer surface portions of each of the leg members are received within complementary configured surfaces of the radially relieved areas. This structural arrangement prevents relative rotation of the two elements of the device, while facilitating quick and easy axial separation thereof.

As shown in FIGS. 1 and 2, the inner surfaces of each of the leg members 26 have threads initially preformed thereon prior to assembly with the nut body 40. The thread formations 28 of the leg members 26 are substantially identical with those of the threaded side walls 46 so that when the leg members are received within the radially relieved areas 48, the preformed threads 28 of the leg members 26 will lie substantially coextensive with the threads on adjacent side wall surfaces 46 of the nut body. It may also be possible to provide smooth unthreaded inner portions on the leg members, and this will be explained in further detail below.

The nut body 42 is preferably provided with a peripherally continuous surface or rim 50 which projects from one end face of the nut body for receiving the apertured body portion 22 of the locking insert therein. A counterbore or the like will similarly receive the portion 22 of the insert. Unauthorized disassembly of the insert and nut body will be prevented by such a structural arrangement since the apertured body portion 22 is adapted to be held in snug fitting relationship within the rim 50 or other equivalent structure. This can be easily accomplished by making the outer peripheral surface of the apertured body portion 22 of substantially the same or slightly greater circumferential or peripheral dimension than that of the rim 50 to provide a slight peripheral contraction of the apertured body portion 22 when inserted within the rim. Alternatively, the legs 26 can be spaced apart the same or a greater distance than the radially relieved areas 48 to provide for the snug fitting reception of the legs therewithin.

The apertured body portion can be made to project above the rim 50 so that when the apertured body portion 22 is forced against a work piece, it will deform in overlying relation with respect to the rim and seal the space between the rim and the apertured body portion 22. In FIG. 5, the association of the assembled locking insert and nut body with a complementary threaded male member 30 and workpiece 32 is shown. In this arrangement, it will be observed that the clamping of the nut body and insert against the workpiece 32 will cause the plastic material of the apertured body portion 22 to deform over the rim 50 and substantially hinder or restrict the ingress of fluids at this point. The inherent resiliency of the plastic material insert also causes the threaded leg members to grip the complementary threaded male member 30 in an aggressive fashion and restrain unauthorized retrograde movement of the male member. This is due primarily to the fact that the threaded surface of at least one of the leg members extends radially inwardly beyond portions of adjacent screw threaded surfaces of the aperture. Furthermore, the association of the leg members 26 of the insert with the threaded side wall surfaces 46 of the nut body is such that fluid is prevented from following the helical path of the thread convolutions of both the nut body 40 and male member 30.

To facilitate the entry of the complementary threaded male member 30 within the assembled insert and nut body, it will be noted that the inner peripheral surface of the apertured body portion 22 is provided with a tapered surface 24. The insert may be so formed as to facilitate the application of the male member from either end of the nut body, and this will become apparent hereinafter.

Another modified form of the present invention is illustrated in FIGS. 6–9, and is shown as generally comprising a locking insert 20a which is adapted to be assembled to nut body 40a. In this form, the aperture 44a of the nut body is substantially triangular in shape as compared with the square form shown in FIGS. 1–5. The axially extending radially relieved areas 50a of the aperture are positioned substantially 120° apart from one another, and are adapted to receive leg members 26a of the locking insert which are located on the apertured body portion 32 in the same manner. As can be perceived from FIG. 9, the leg members 26a are provided with smooth unthreaded inner portions in order that threads may be cut therein by the complementary threaded male member 30 when associated with the assembled insert and nut. The threads impressed in the leg members 26a will lie substantially coextensive with adjacent threaded side wall surfaces 46a due to the mating engagement of the threads of the nut body and male member. The leg members 26 of the FIGS. 1–5 embodiment may also be provided with smooth unthreaded inner portions if desired.

While not limited to this particular form, the leg members 26a are shown as having an axial length less than that of the nut body 40a, the outer free extremities of which are tapered to facilitate the entry of the threaded male member from one end face of the nut which is opposite to that on which the apertured body portion 22a is positioned. Providing tapered legs in addition to the tapered inner peripheral surface 24a of the apertured body portion 22a will permit ease of entry of the male member from either end face of the nut body.

Instead of providing a rim for receiving and retaining the insert 20a, the legs 26a can be held in snug fitting relation by the radially relieved areas 48a as has been previously discussed.

Alternate structural forms for the locking insert are illustrated in FIGS. 10 and 11. Locking insert 60 shown in FIG. 10 is adapted to be used with the FIGS. 6–9 embodiment, and generally comprises a peripherally continuous body portion 62 throughout its entire axial length having a plurality of alternating leg segments 64 and web segments 66. The locking insert 70 of FIG. 11 is also provided with a peripherally continuous body portion 72 having alternating leg segments 74 and web segments 76. Insertion of either of these forms within a complementary configured aperture of a nut body is accomplished by aligning the leg segments 64, 74 with complementary radially relieved areas of the nut body aperture, and then forcing the insert within the nut body. When the complementary threaded male member is associated with the assembled insert and nut body, the web segments 66, 76 are adapted to be separated from the leg segments by the mating engagement of the male member and nut body leaving only the leg segments 64, 74. The leg segments 64, 74 will be retained within the radially relieved areas of the nut body, without the connecting web segments 66, 76, and still function to resist unauthorized separation of the members while providing a seal therebetween. These latter two forms are particularly useful where it is desired to have the clamping surface of a nut forced against a workpiece.

It may also be desirable to provide locking inserts 60 and 70 with an outer peripheral dimension substantially the same as or slightly larger than that of the aperture with which it is to be associated in order that the insert may be securely retained to the nut body.

From the above description, it will be seen that the present invention contemplates a novel fastening device made of two parts which is adapted to lock and provide a seal for an associated rotary fastening member, retain the parts together in a secure fashion, and facilitate ease of application and separation of the two parts from each other. The locking insert element of the novel fastening device also facilitates ease of application of the associated rotary fastening member from either end face of the nut body element to provide reversibility of the device.

While the preferred embodiments of the present invention have been shown and described herein, it is obvious that many structural details may be changed without departing from the spirit and scope of the appended claims.

What is claimed is:

1. A locking nut for use with a complementary threaded male member including a peripherally continuous nut body means of polygonal exterior configuration and having a centrally located aperture provided therein, the peripheral wall defining said aperture being generally polygonal and having at least three spaced axially extending, radially relieved areas separated by threaded side wall surfaces, each of said radially relieved areas comprising a pair of angularly disposed, juxtaposed flat wall portions spaced a maximum predetermined distance from each other at the points of intersection with the threaded side wall surfaces and extending radially outwardly and converging toward each other, a locking and sealing insert of deformable plastic material associated with said peripherally continuous nut body means and including an annular body portion having a plurality of axially extending, peripherally spaced flexible leg members projecting from said annular body portion, said leg members corresponding in number and spacing to said radially relieved areas and having an outer peripheral surface complementary to said angularly disposed, juxtaposed flat wall portions to facilitate assembly of said locking and sealing insert with said peripherally continuous nut body means while preventing relative rotation therebetween, said leg members presenting surfaces extending radially inwardly to at least the crest diameter of adjacent threaded side wall surfaces, the threaded male member adapted to be received within the annular body portion of said locking and sealing insert and cooperating with said surfaces of the leg members when threadably associated with said peripherally continuous nut body means whereby to lock said threaded male member and said locking nut against unauthorized retrograde movement relative to each other and provide a seal throughout their threadably associated height.

2. A locking and sealing nut as defined in claim 1 wherein each radially extending surface of said leg members is provided with preformed threads thereon which lie substantially coextensive with the threads on adjacent side wall surfaces when said insert is mounted within said nut body.

3. A locking and sealing nut as defined in claim 1 wherein said male member forms threads in each radially extending surface of said leg members which are coextensive with the threads on adjacent side wall surfaces when said insert is mounted within said nut body.

4. A locking and sealing nut as defined in claim 1 wherein said aperture is substantially square in shape, and said leg members are positioned substantially 90° distant from one another.

5. A locking and sealing nut as set forth in claim 1 wherein said aperture is substantially triangular in shape, and the leg members of said insert are spaced approximately 120° from one another.

6. A locking and sealing nut for use with a complementary threaded male member including a nut body having a centrally located aperture, the peripheral wall defining said aperture having a plurality of spaced axially extending radially relieved areas to provide a plurality of pockets intermediate threaded side wall surfaces of said aperture, a locking and sealing insert made of deformable plastic material associated with said nut body and including an apertured body portion having a plurality of axially extending peripherally spaced leg members joined together by thin connecting webs, said leg members received within said axially extending radially relieved areas to mount said insert against rotation with said thin connecting web traversing the threaded side wall surfaces, at least one of said leg members presenting a surface which extends radially inwardly beyond portions of adjacent screw threaded surfaces for cooperation with said threaded male member when inserted within said nut body whereby to lock said complementary threaded male member against unauthorized retrograde movement and provide a seal between said nut body and male member, the thin connecting webs adapted to be separated from said leg members upon threaded engagement of said nut body and male member.

References Cited by the Examiner

UNITED STATES PATENTS

| | | | |
|---|---|---|---|
| 2,377,186 | 5/1945 | Saleh | 151—22 |
| 2,457,945 | 1/1949 | Von Soden | 151—7 |
| 2,464,379 | 3/1949 | Courtot | 151—7 |
| 2,570,658 | 10/1951 | Farrell et al. | 151—7 |
| 2,852,056 | 9/1958 | Rapata | 151—7 |

FOREIGN PATENTS

| | | |
|---|---|---|
| 372,405 | 5/1932 | Great Britain. |
| 490,680 | 8/1938 | Great Britain. |

EDWARD C. ALLEN, *Primary Examiner.*